(12) United States Patent
Sankrithi

(10) Patent No.: US 10,371,095 B2
(45) Date of Patent: Aug. 6, 2019

(54) NACELLE-INTEGRATED AIR-DRIVEN AUGMENTOR FAN FOR INCREASING PROPULSOR BYPASS RATIO AND EFFICIENCY

(71) Applicant: The Boeing Company, Chicago, IL (US)

(72) Inventor: Mithra M. K. V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 705 days.

(21) Appl. No.: 14/929,000

(22) Filed: Oct. 30, 2015

(65) Prior Publication Data

US 2017/0122257 A1 May 4, 2017

(51) Int. Cl.
| | |
|---|---|
| *F02K 3/06* | (2006.01) |
| *F02K 3/077* | (2006.01) |
| *F02K 3/072* | (2006.01) |
| *F01D 5/02* | (2006.01) |
| *F02C 6/20* | (2006.01) |

(52) U.S. Cl.
CPC ............... *F02K 3/06* (2013.01); *F01D 5/02* (2013.01); *F02C 6/206* (2013.01); *F02K 3/072* (2013.01); *F02K 3/077* (2013.01); *F05D 2220/325* (2013.01); *F05D 2220/327* (2013.01)

(58) Field of Classification Search
CPC . F02K 3/06; F02K 3/072; F02K 3/077; F01D 5/02
See application file for complete search history.

(56) References Cited

U.S. PATENT DOCUMENTS

| | | | | |
|---|---|---|---|---|
| 3,363,419 | A * | 1/1968 | Wilde | F02K 3/062 415/119 |
| 8,397,487 | B2 * | 3/2013 | Sennoun | B64D 13/06 60/266 |
| 8,689,538 | B2 * | 4/2014 | Sankrithi | B64C 11/48 60/226.1 |
| 2014/0223884 | A1 | 2/2014 | Sankrithi et al. | |

\* cited by examiner

*Primary Examiner* — Carlos A Rivera
*Assistant Examiner* — Thuyhang Nguyen
(74) *Attorney, Agent, or Firm* — Haynes and Boone, LLP

(57) ABSTRACT

Systems and methods are provided for an air-driven augmentor fan equipped aircraft propulsor. The augmentor fan may increase the effective bypass ratio of the aircraft propulsor and reduce fuel consumption and carbon emissions of the aircraft. The augmentor fan may be driven by air energized by a ducted fan powered by the core engine of the aircraft propulsor. The energized air may be received by an inlet, flowed through a flow path, and exhausted out the outlet to drive the augmentor fan. The exhausted energized air may impart a torque on the augmentor fan or blades of the augmentor fan. One or more of the inlet, flow path, or outlet may be variable in size to control the volume of air flowed through the flow path.

29 Claims, 21 Drawing Sheets

NACELLE-INTEGRATED AIR-DRIVEN AUGMENTOR FAN FOR INCREASING PROPULSOR BYPASS RATIO AND EFFICIENCY

TECHNICAL FIELD

The disclosure relates generally to turbine engines and more particularly to augmented turbofan engines.

BACKGROUND

Airplane and engine configurations that yield reduced fuel burn per seat-mile, which is a metric of airplane fuel efficiency and carbon dioxide emissions, are highly desirable for commercial aircraft. This need for reduced fuel burn per seat-mile may be in conjunction with anticipated near-term increases in stringency of community noise certification regulations. Current European workplace noise exposure regulations that affect allowable aircraft cabin noise work together with local airport environmental policies to also pose significant challenges to advanced propulsion design.

The emissions-based requirements motivate extremely high bypass ratio engines that can most easily be accomplished with un-shrouded engines. Some such un-shrouded engines, however, may generate high amounts of noise and may be perceived of by passengers as low tech.

One existing approach to providing improved fuel efficiency or reduced fuel burn is to utilize turbofan engines with higher bypass ratios. However, very high bypass ratio turbofans suffer from large weight and drag penalties associated with their very large nacelles. Very high bypass ratio turbofans also suffer from difficulties associated with achieving under-wing installations in low wing airplanes and difficulties in achieving simple lightweight thrust reversers due to their large bypass ratios.

Another existing approach to providing improved fuel efficiency or reduced fuel burn is to utilize a turboprop, propfan, or other "open rotor" types of propulsor. An open rotor propulsor is effectively a propeller with a plurality (e.g., six to twelve) of discrete individual blades exposed at their tips, with a gas turbine core engine driving the propeller through a gearbox. Open rotor propulsors provide substantially better fuel burn through a higher effective bypass ratio and elimination of fan duct drag and weight, but entail airplane integration challenges, non-optimal community noise levels, and non-optimal cabin noise and vibration.

Thus, there is a need for improvements in turbine engine technology to provide high fuel efficiency, low emissions, low noise, and overall improved integration.

SUMMARY

Systems and methods are disclosed herein providing an air-driven augmentor fan equipped aircraft propulsor. In certain embodiments, an aircraft propulsor may be provided. The aircraft propulsor may include a nacelle, a turbofan engine including a core engine and a ducted fan driven by the core engine, the ducted fan circumscribed by the nacelle, an augmentor fan including a plurality of augmentor fan blades, the augmentor fan circumscribing the nacelle and configured to rotate separately from the ducted fan, and at least one air flow path connecting at least one inlet and at least one outlet. The at least one air flow path may be at least partially housed within a portion of the nacelle. The at least one inlet may be coupled to or housed within the nacelle. The at least one inlet may be configured to receive air energized by the ducted fan. The at least one outlet may be configured to exhaust the energized air to drive the augmentor fan.

In certain other embodiments, an aircraft may be provided. The aircraft may include an aircraft propulsor, a fuselage, and a wing coupled to the fuselage, such that the aircraft propulsor is coupled to at least one of the fuselage and the wing. The aircraft propulsor may include a nacelle, a turbofan engine including a core engine and a ducted fan driven by the core engine, the ducted fan circumscribed by the nacelle, an augmentor fan including a plurality of augmentor fan blades, the augmentor fan coupled to the nacelle and configured to rotate separately from the ducted fan, and at least one air flow path connecting at least one inlet and at least one outlet. The at least one air flow path may be at least partially housed within a portion of the nacelle. The at least one inlet may be coupled to or housed within the nacelle. The at least one inlet may be configured to receive air energized by the ducted fan. The at least one outlet may be configured to exhaust the energized air to drive the augmentor fan.

In certain additional embodiments, a method may be provided. The method may include receiving air energized by a ducted fan of an aircraft propulsor, flowing the energized air to an outlet, exhausting the energized air from the outlet, and driving, with energy from the exhausted air, an augmentor fan.

In other embodiments, an aircraft propulsor may be provided. The aircraft propulsor may include a nacelle, a turbofan engine including a core engine and a ducted fan driven by the core engine, the ducted fan circumscribed by the nacelle, an augmentor fan including a plurality of augmentor fan blades, the augmentor fan circumscribing the nacelle and configured to rotate separately from the ducted fan, and at least one air flow path. The at least one air flow path may include means for receiving air energized by the ducted fan, flowing the energized air to an outlet, exhausting the energized air from the outlet, and driving, with energy from the exhausted air, the augmentor fan.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Airplane engine configurations that yield reduced fuel burn may be highly desirable. One existing approach to providing improved fuel efficiency is to utilize turbofan engines with higher bypass ratios. Another existing approach to providing improved fuel efficiency or reduced fuel burn is to utilize a turboprop, propfan, or other "open rotor" types of propulsor. However, high bypass turbofans and turboprop, propfan, or other open rotor type propulsors may have certain disadvantages.

The techniques and systems described herein may yield reduced fuel burn. In various embodiments, an aircraft propulsor with an air-driven nacelle-integrated augmentor fan may be disclosed. In certain embodiments, the augmentor fan may be integrated on a turbofan engine. The augmentor fan may be driven by energized air from a ducted fan of the turbofan engine. The energized air may be received by an inlet that receives air energized by the ducted fan of the turbofan engine (e.g., after the air has traveled past the ducted fan) and the energized air that is received by the inlet may travel through a flow path and exit through an outlet to drive the augmentor fan.

An air-driven augmentor fan equipped aircraft propulsor may yield reduced fuel burn compared to conventional turbofan propulsors due to a greater effective bypass ratio. In addition, as the augmentor fan is air-driven, there is no or little parasitic loss on the core engine to operate the augmentor fan. Thus, further fuel savings may be realized. Also, the fan blade count and configuration of the augmentor fan may be configured to optimize operation of the augmentor fan over a wide range of air speeds and propulsor speeds as well as minimize or even reduce the noise levels of the propulsor.

Figure 1A:
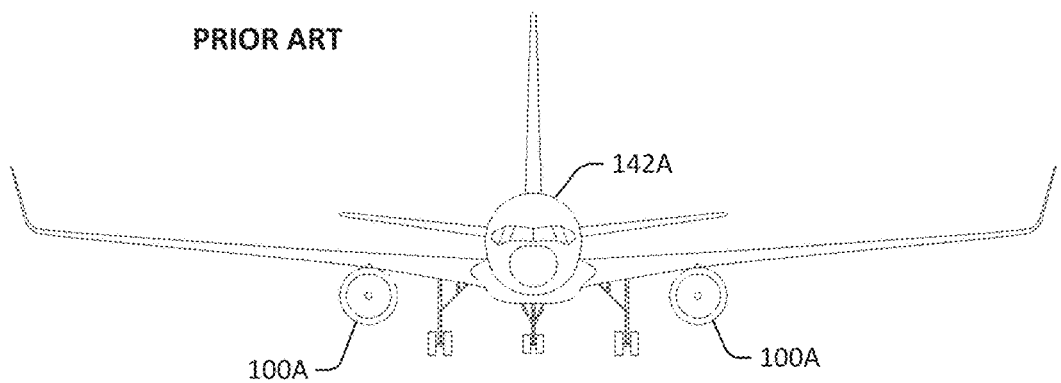
FIG. 1A illustrates a front view of a conventional prior art example aircraft.

FIG. 1A illustrates a front view of a conventional prior art example aircraft. The aircraft 142A in FIG. 1A includes two conventional aircraft propulsors 100A are coupled to the wings of the aircraft 142A. The conventional aircraft propulsor 100A may be a turbofan engine.

Figure 1B:
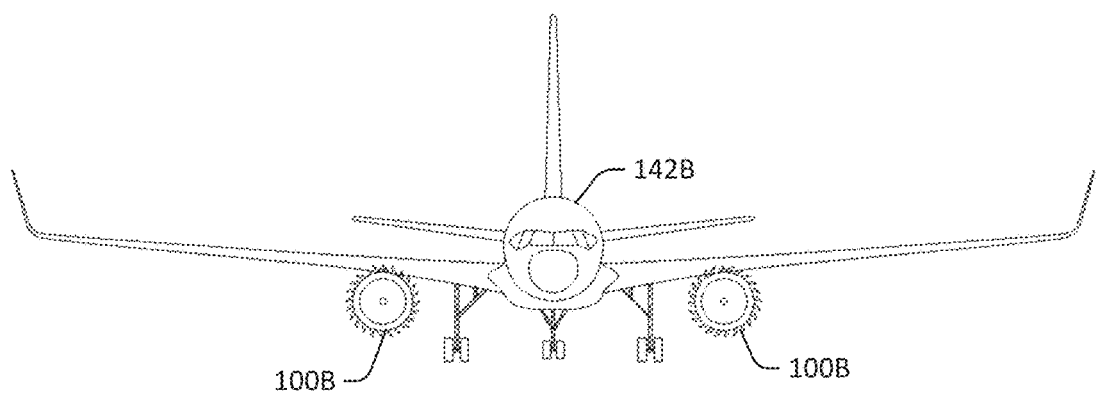
FIG. 1B illustrates a front view of an example aircraft in accordance with the disclosure.

FIG. 1B illustrates a front view of an example aircraft in accordance with the disclosure. The aircraft 142B in FIG. 1B includes a two air-driven augmentor fan equipped propulsors 100B. The air-driven augmentor fan equipped propulsors 100B are coupled to the wings of the aircraft, but other embodiments may couple air-driven augmentor fan equipped propulsors to the fuselage, the tail, or any combination of the fuselage, the wing, and the tail.

Figure 2:
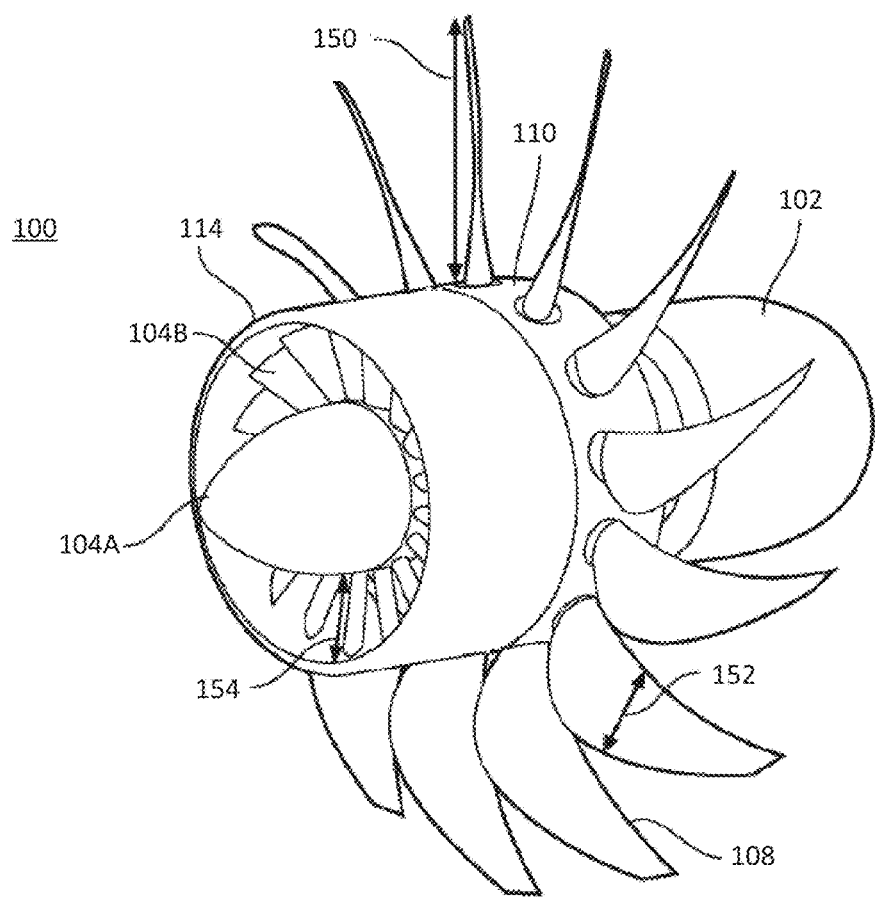
FIG. 2 illustrates a 3-dimensional view of a propulsor with an air-driven augmentor fan in accordance with the disclosure.

FIG. 2 illustrates a 3-dimensional view of a propulsor with an air-driven augmentor fan in accordance with the disclosure. FIG. 2 is an illustration of an air-driven augmentor fan equipped aircraft propulsor 100. The air-driven augmentor fan equipped aircraft propulsor 100 includes a core engine 102, a ducted fan 104A with a plurality of ducted fan blades 104B, an augmentor hub ring 110, an augmentor fan 108 with a plurality of augmentor fan blades. The augmentor hub ring 110 may be substantially aerodynamically flush with a nacelle 114 of the ducted fan 104A. The nacelle 114 may cover the ducted fan 104A and may be made of multiple parts including an inlet, a fan cowl, a thrust reverser, an exhaust, and/or other components. A diameter of the ducted fan 104A may be, for example but without limitation, about 6 feet to about 12 feet depending on required thrust levels.

A number of the augmentor fan blades of the augmentor fan 108 may be, for example but without limitation, between three to sixty in quantity. The augmentor fan blades may each have an augmentor fan blade span 150. Each of the augmentor fan blades may also have an average chord 152 to augmentor fan blade span 150 ratio of, for example but without limitation, between about 0.02 to about 2. Each of the augmentor fan blades may include a tip that may be, for example but without limitation, nonzero taper, nonzero sweep, morphably controllable surfaces, aerodynamic suction or blowing, and the like. In one embodiment, an activity factor of the augmentor fan blades of the augmentor fan 108 may be, for example but without limitation, from about 150 or lower to about 250. Alternatively, other embodiments may include augmentor fan blades with activity factors greater than 250. According to embodiments of the disclosure, the number of the augmentor fan blades of the augmentor fan 108 and a number of the ducted fan blades 104B can be chosen to avoid sum and difference tones, thus improving sound quality and volume. For example, a ratio of augmentor fan blades to the ducted fan blades 104B may be, for example but without limitation, 16/13, 16/7, 13/18, and the like.

The augmentor fan blades may be driven by air energized by the ducted fan blades 104B. The ducted fan blades 104B are shaped and tailored in design to optimally provide the energized air to drive the augmentor fan. The air may first be energized by the ducted fan blades 104B or portions thereof and may then flow into an inlet, through a flow path, and exit or exhaust out of an outlet. Energy from the air exiting the outlet may drive the augmentor fan blades.

The augmentor hub ring 110 may include bearings to allow the augmentor fan 108 to rotate independently of the nacelle 114. The augmentor fan blades of the augmentor fan 108 may be coupled to the augmentor hub ring 110, though other embodiments may include intermediate features between the augmentor fan blades and the augmentor hub ring 110, including mechanisms to adjust the geometry of the augmentor fan blades 108, such as augmentor fan blade pitch controls that may include forward or reverse thrust control or other such blade aerodynamic shape control.

The augmentor fan 108 may be located aft of the ducted fan 104A. Various embodiments may have the augmentor fan 108 turning in the opposite or same direction as the ducted fan 104A, and may have same-handed or opposite-handed propulsors installed on the port and starboard sides of an aircraft respectively (e.g., installed on port and starboard wings). Designs may be optimized to minimize swirl losses behind a propulsor, and designs may use opposite-handed propulsors to minimize aircraft net drag and to significantly reduce or eliminate any necessity to have airframe left and right handed differences to address aerodynamic asymmetries, for example, due to propulsor swirl effects.

Figure 3:
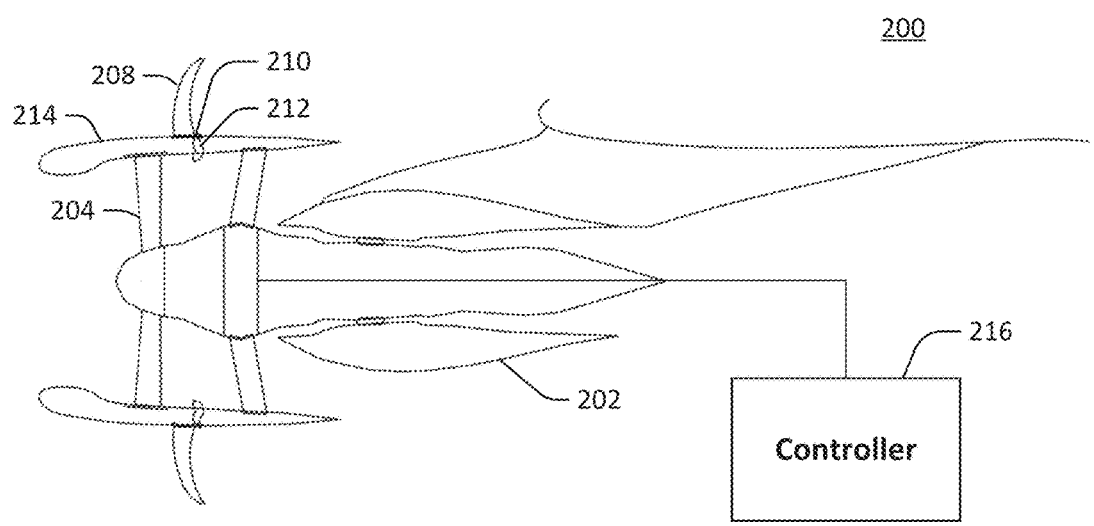
FIG. 3 illustrates a cross sectional view of a propulsor with an air-driven augmentor fan in accordance with the disclosure.

FIG. 3 illustrates a cross sectional view of a propulsor with an air-driven augmentor fan in accordance with the disclosure. The propulsor 200 in FIG. 3 may include a ducted fan 204, a nacelle 214, an augmentor fan 208, a flow path 212, a hub ring 210, a core engine 202, and a controller 216.

The controller 216 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 216 and/or its associated operations may be implemented as a single device or multiple devices (e.g., communicatively linked through wired or wireless connections) to collectively constitute the controller 216.

The controller 216 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 216 may be adapted to execute instructions stored within the memory to perform various methods and processes described herein, including implementation and execution of control algorithms responsive to sensor and/or operator (e.g., flight crew) inputs.

The controller 216 may also include, in certain examples, an input device (e.g., buttons, knobs, sliders, touch screens, touch pads or other input devices) adapted to interface with a user and receive user input. In certain examples, the controller 216 may include a graphical user interface (GUI), which may be integrated as part of a display or other input device. In certain such examples, the input device and the GUI may be contained within one device.

The controller 216 may be connected to the core engine 202, the flow path 212, the inlets and outlet of the flow path 212, the augmentor fan 208, and/or the ducted fan 204. The inlets and outlet of the flow path 212, the flow path 212, the augmentor fan 208, and/or the ducted fan 204 may include actuators, motors, and surfaces that may vary in geometry according to instructions provided by the controller 216. For example, the controller 216 may provide one or more control signals to adjust a pitch angle of the augmentor fan 208. The hub ring 210 may also include mechanisms to increase or decrease a rotation drag of the hub ring 210 (allowing it to rotate faster or slower) and such mechanisms may also be controlled through instructions from the controller 216.

The ducted fan 204 and the nacelle 214 may be similar to the ducted fan 104 and the nacelle 114 in FIG. 1. In various embodiments, the nacelle 214 may include multiple components as described herein. The augmentor fan 208 may be configured to rotate independently of the ducted fan 204. That is, the speed and/or direction of rotation of the augmentor fan 208 may be independent of the speed and/or direction of rotation of the ducted fan 204.

As shown in FIG. 3, the flow path 212 may include an inlet and an outlet fluidically connected together. The inlet of the flow path 212 may be located within an inside of the nacelle 214. That is, the inlet of the flow path 212 may receive air energized by the ducted fan 204 flowing within the nacelle 214. The air, after it is received by the inlet of the flow path 212, may then flow through the flow path 212 and exit out the outlet of the flow path 212 to drive the augmentor fan 208. In the embodiment shown in FIG. 3, the outlet may be located aft of the augmentor fan 208 (e.g., rearward of the augmentor fan 208 as defined by the air flow) or may be located on a back side (e.g., a surface of the augmentor fan blade facing the tail of the aircraft) of the augmentor fan 208 or on a portion of the augmentor hub ring 210 facing rearwards. In other embodiments, the outlet of the flow path 212 may be located forward of the augmentor fan 208, but facing rearwards and designed to impart a torque on the augmentor fan 208 to spin the augmentor fan 208. Techniques used to drive the augmentor fan 208 may be further described herein.

Figure 4A:
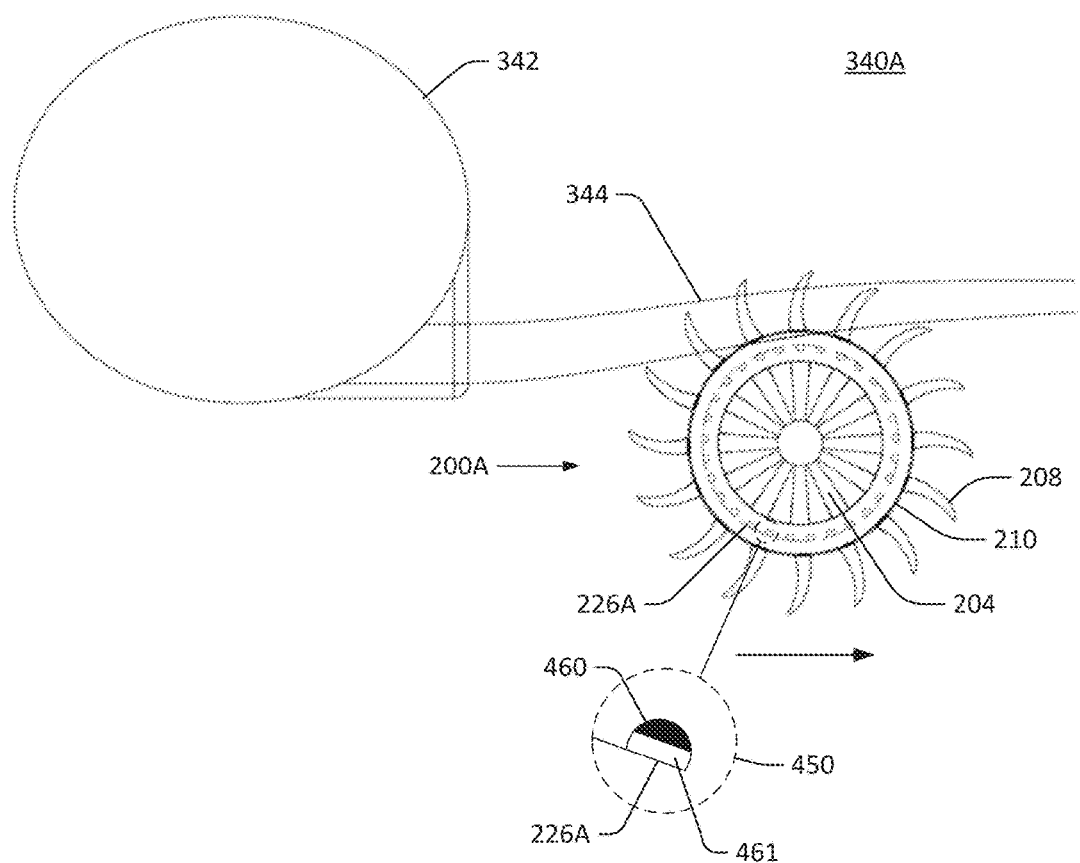
FIG. 4A illustrates a front view of a propulsor with an air-driven augmentor fan in accordance with the disclosure.
Figure 6:
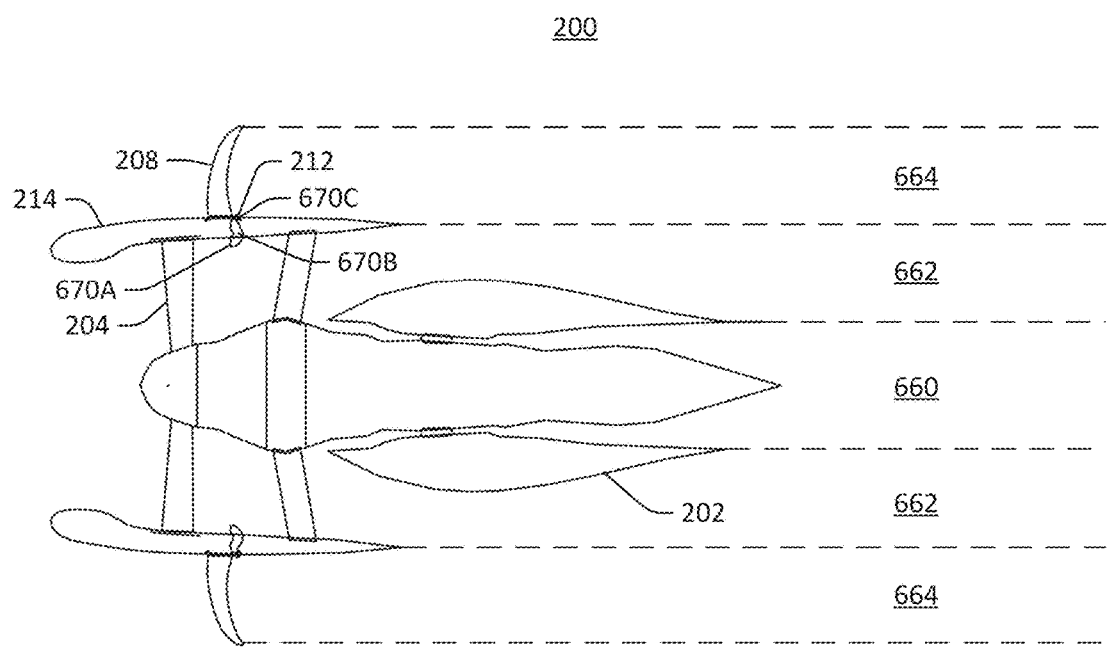
FIG. 6 is an illustration of three mass flow streams of an exemplary aircraft propulsor with an air-driven augmentor fan in accordance with an embodiment of the disclosure.

FIG. 4A illustrates a front view of a propulsor with an air-driven augmentor fan in accordance with the disclosure. FIG. 4A shows an aircraft 340A with a fuselage 342, a wing 344, and a propulsor 200A. The propulsor 200A may include a ducted fan 204, an augmentor fan 208, a hub ring 210, and inlets 226A that may receive air and flow the air through a flow path. The inlet 226A of the embodiment shown in FIG. 4A may include separate individual inlets. In certain embodiments, each inlet 226A may receive air and flow it to an individual air flow path. Other embodiments may direct the air received by each individual inlet 226A into one common plenum or multiple plenums where each individual plenum may receive air from multiple inlets. The inlet 226A may vary in cross sectional area by, for example, the opening and closing of blocking doors such as blocking door 460 within the inlet 226A that may increase obstruction of the inlet 226A when closed, by the opening and closing of orifices within the inlet 226A, by relaxing or constricting the inlet 226A (e.g., by having an adjustable inlet), or through other techniques. FIG. 4A illustrates one such technique. Drawing highlight 450 illustrates an inlet 226A that includes a blocking door 460. The blocking door 460 may partially or completely open and close depending on the restriction desired. For example, opening the blocking door 460 (i.e., having the blocking door 460 restrict less of the inlet 226A) may decrease restriction and thus increase air flow through the inlet 226A. Conversely, closing the blocking door 460 may increase restriction within the inlet 226A and thus decrease air flow through the inlet 226A. In the example shown in FIG. 4A, the blocking door 460 is partially open, permitting an opening 461 in inlet 226A to remain. The techniques described restricting flow through the inlets may also be applied to the flow paths and/or the outlets. Referring now to FIG. 6, areas 670A-C illustrate various areas that the techniques for restricting flow may be applied. As shown in FIG. 6, inlet area 670A, flow path area 670B, and outlet area 670C may all be areas that the various techniques described for restricting flow may be applied to. Although such restrictions have been illustrated with respect to FIGS. 4A and 6, these techniques may be applied to any of the various flow paths identified by the present disclosure.

Referring back to FIG. 4A, FIG. 4A also includes an arrow. The arrow may indicate a direction of rotation of the augmentor fan 208. Accordingly, in FIG. 4A, the augmentor fan 208 may be rotating away from the fuselage 342 of the aircraft at the bottom or nadir of its rotation (e.g., the portion of the rotation of the augmentor fan where the augmentor fan blade is closest to ground).

Figure 4B:
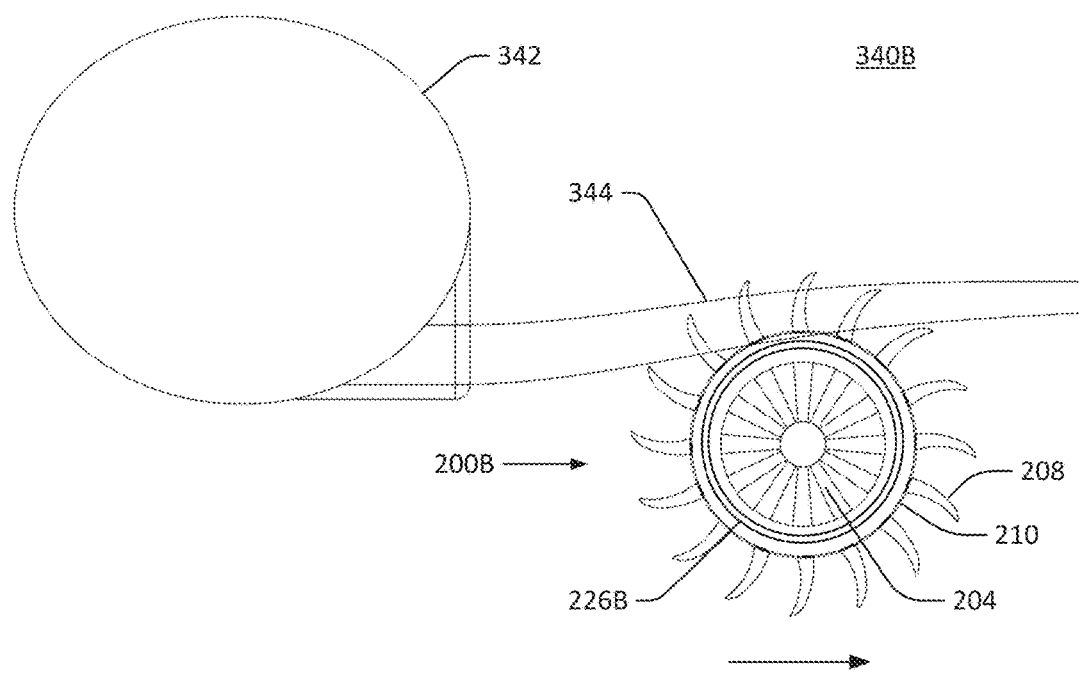
FIG. 4B illustrates a front view of another propulsor with an air-driven augmentor fan in accordance with the disclosure.

FIG. 4B illustrates a front view of another propulsor with an air-driven augmentor fan in accordance with the disclosure. FIG. 4B shows an aircraft 340B with a fuselage 342, a wing 344, and a propulsor 200B. The propulsor 200B may include a ducted fan 204, an augmentor fan 208, a hub ring 210, and an inlet 226B. The inlet 226B of the embodiment shown in FIG. 4B may be an inlet extending circumferentially along a circumference concentric with the opening of the nacelle (e.g., the fan cowl or inlet portion of the nacelle). Certain other embodiments may include several semi-circular inlets. In certain embodiments, the inlet 226B may flow air to a single plenum, but other embodiments may flow air to multiple flow paths. In embodiments where air is flowed into a single plenum, the plenum may then flow the air into one or multiple outlets.

Figure 4C:
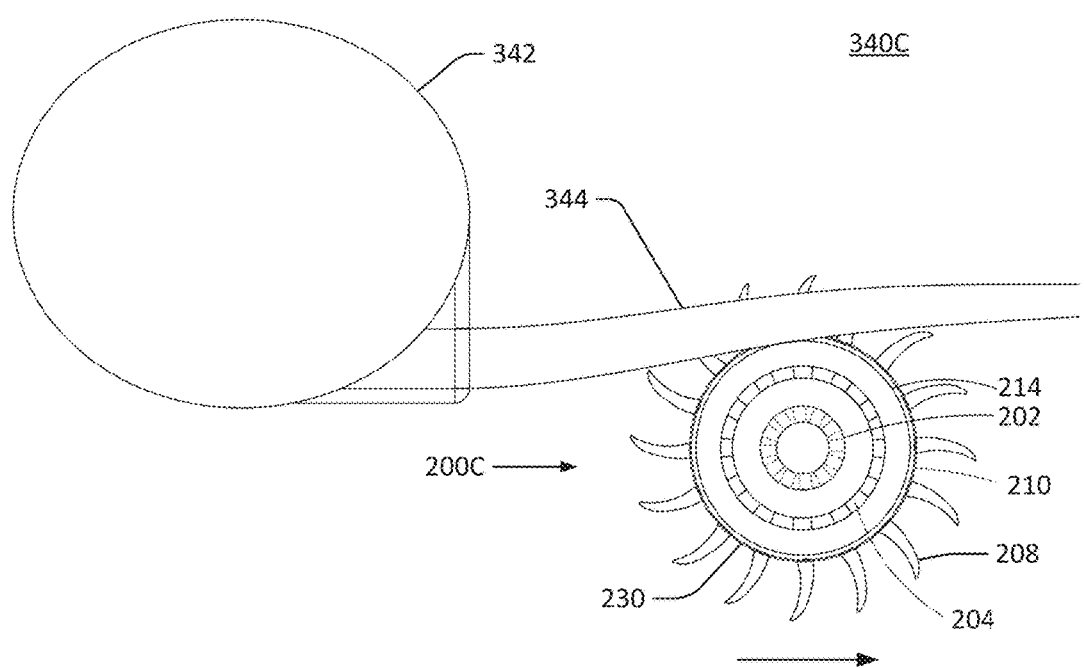
FIG. 4C illustrates a rear view of a propulsor with an air-driven augmentor fan in accordance with the disclosure.

FIG. 4C illustrates a rear view of a propulsor with an air-driven augmentor fan in accordance with the disclosure. The aircraft 340C of FIG. 4C includes a fuselage 342, a wing 344, and a propulsor 200C. FIG. 4C may show a reverse view of the views shown in FIGS. 4A and 4B. Accordingly, FIG. 4C may show the rear view of an aircraft propulsor.

The propulsor 200C may include a core engine 202, a ducted fan 204, an augmentor fan 208, a hub ring 210, a nacelle 214, and an outlet 230. The ducted fan 204 shown in FIG. 4C may be seen through a bypass path of the propulsor 340C. The outlet 230 may allow air energized by the ducted fan 204 to exit the flow paths after they have been received through inlets. The outlet 230 may be a single outlet extending circumferentially along the nacelle 214, or it may be multiple individual outlets (similar to the inlets 226A in FIG. 4A), or several semi-circular outlets. The outlet 230 may include geometry to allow the energized air exhausted by the outlet 230 to impart a force on the augmentor fan 208. The force may be imparted by, for example, directing energized air in such a way as to impart a torque on the augmentor fan 208 and thus causing the augmentor fan 208 to rotate. Certain embodiments may impart the torque on the augmentor fan blades by having the outlet 230 at a fixed offset distance from one or more augmentor fan blades. Certain other embodiments may exhaust the energized air with an azimuth component, relative to the augmentor fan blade. The azimuth component may impart a torque on the augmentor fan blade or may assist in imparting such a torque. Certain embodiments of the outlet 230 may be mounted on the nacelle 214, on the hub ring 210, or on a portion of the augmentor fan blade or other parts of the augmentor fan 208 and/or augmentor hub ring 210.

Figure 5A:
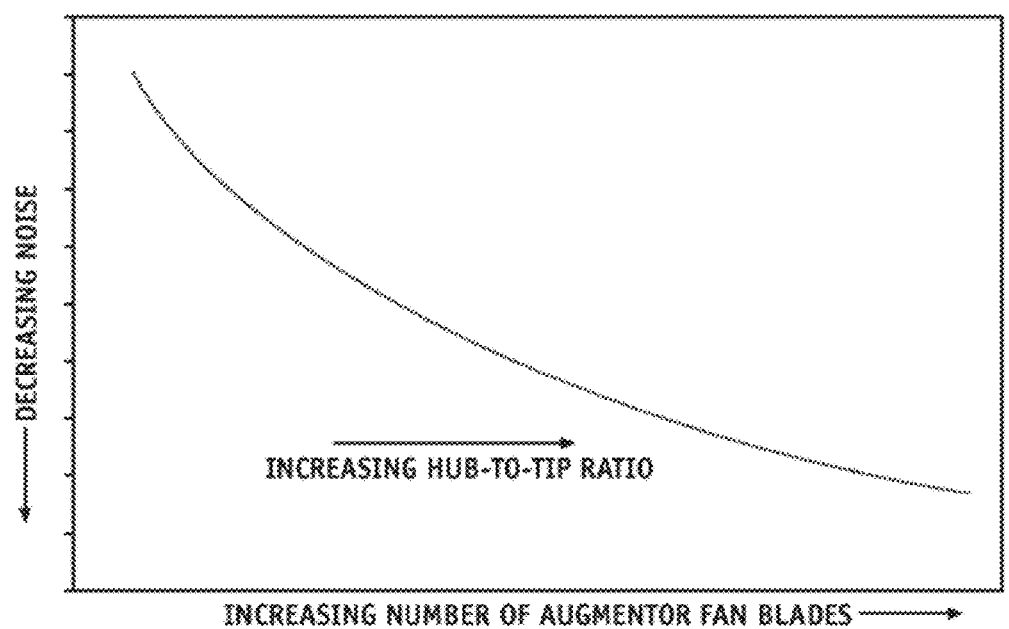
FIG. 5A is a graph illustrating a relationship between a number of augmentor fan blades, and noise as a function of hub-to-tip ratio for an example aircraft propulsor with an air-driven augmentor fan in accordance with an embodiment of the disclosure.

FIG. 5A is a graph illustrating a relationship between a number of augmentor fan blades, and noise as a function of hub-to-tip ratio for an example aircraft propulsor with an air-driven augmentor fan in accordance with an embodiment of the disclosure. As shown in FIG. 5A, noise decreases as the number of augmentor fan blades increases.

Existing propeller design practice is generally limited to up to about six to ten blades because of challenges with, for example but without limitation, integration of the propeller pitch control unit (PCU), blade support bearings, blade root size limitations, and the like. Blade root size for existing propellers is constrained by a small size of a propeller hub relative to a length of a propeller blade (i.e., low hub to tip ratio). For the existing propfan engine 200, a forward speed of an attached aircraft combined with the rotational speed of blades of the unducted propfan 204 may result in undesirable additional wave drag at aircraft speeds over about Mach 0.7. Current art cannot use propeller blades with aggressive tailoring such as an aggressive sweep and lean (good for low noise) due to flutter caused in part by a small base of hubs of the current art.

There are a number of benefits to the large number of blades made possible with the augmentor fan according to various embodiments of the disclosure. For example, wave drag can be reduced by using the larger number of the augmentor fan blades 406 allowing production of more power at a lower rotational speed. Also, a noise frequency may be changed to a more desirable frequency.

A blade pass frequency (BPF) of a fan refers to a frequency at which blades pass a fixed eternal location. The BPF also indicates a frequency of noise caused by the blades, since blade noise generally corresponds in frequency with the BPF. The fan BPF noise level intensity can vary with the number of blades and the rotation speed. The fan BPF noise level can be expressed as:

$$BPF = \frac{n*t}{60},$$

where BPF is Blade Pass Frequency in Hz, n is rotation velocity in rpm, t is number of the blades, and 60 is time in seconds.

For example, if a fan with 10 blades rotates with 2400 rpm, the BPF can be calculated as follow:

$$BPF = \frac{2400*10}{60} = 60 \text{ Hz}$$

The BPF of the existing art is generally below 100 Hz. For existing propfan engines, the BPF may be between about 70 Hz and about 100 Hz. For the existing propfan engines, the energy in the sound waves below 100 Hz may be high and audible to the surroundings, especially in configurations with few fan blades. In contrast, a BPF of embodiments of the present disclosure can be between about 300 Hz to about 400 Hz due to higher numbers of blades. Sound waves of 300 Hz to 400 Hz are more readily attenuated by the atmosphere than 100 Hz sound waves. Sound waves of 300 Hz to 400 Hz also possess more desirable structural resonance excitation properties relative to 100 Hz or less sound waves. Sound waves of 300 Hz to 400 Hz enable use of more effective and lighter weight cabin noise attenuation structures and techniques.

In an active control of tonal noise from fans, one factor that can limit an achievable attenuation is fluctuation of the BPF in time. Large fluctuations in a short time can hinder an algorithm from converging to the optimal solution, and can require larger actuation systems that require greater energy. Some fans have less steady speeds than others, which can be due to unsteady driving mechanisms or the physical structure of the fan. Environmental effects, such as back pressure and unsteady blade loading, can also cause speed of the fan to fluctuate. The shifting in the BPF can be measured using a zero-crossing technique to track the frequency of each cycle. Using the example of the embodiment illustrated in FIG. 3, the controller 216 may be used to control the frequency of each cycle by, for example, varying the size of the flow path 212 (e.g., by varying the size of the inlet, exhaust, or other portion of the flow path 212), controlling the amount that the ducted fan 204 energizes the air flow (e.g., by controlling the rotational speed of the ducted fan 204), and/or controlling a resistance imparted by the hub ring 210 to the rotation of the augmentor fan 208 (e.g., through variations of magnetic resistance or by application or friction materials such as pads to slow the spinning of the augmentor fan 208).

Also, as shown in FIG. 5A, noise decreases as hub-to-tip ratio increases. A high hub-to-tip ratio enables integration of more propeller blades (e.g., more augmentor fan blades), which may be significantly beneficial for reducing noise. As mentioned above, the number of the augmentor fan blades and a number of the ducted fan blades can be chosen to avoid sum and difference tones. In certain embodiments, the augmentor fan blades may have a high hub-to-tip ratio to allow a single hub blade count of up to 14, 16 or more. This may allow greater volume for blade retention, blade pitch change, and the like. In addition, the high hub-to-tip ratio enables use of higher activity factor blades with more aggressive tailoring of the propeller blade shape for low noise and improved performance at higher speeds. Furthermore, due to high hub diameter, an overall span (e.g., augmentor fan blade span 150 in FIG. 2) of a propeller blade can be reduced, relieving flutter. A high hub-to-tip ratio by itself may cause a second order effect that reduces noise. In an embodiment, an augmentor fan blade hub-to-tip ratio is larger than a corresponding ratio for at least one of a propfan propulsor and a turboprop propulsor. The augmentor fan blade hub-to-tip ratio may be, for example but without limitation, at least about 0.4 or more.

Figure 5B:
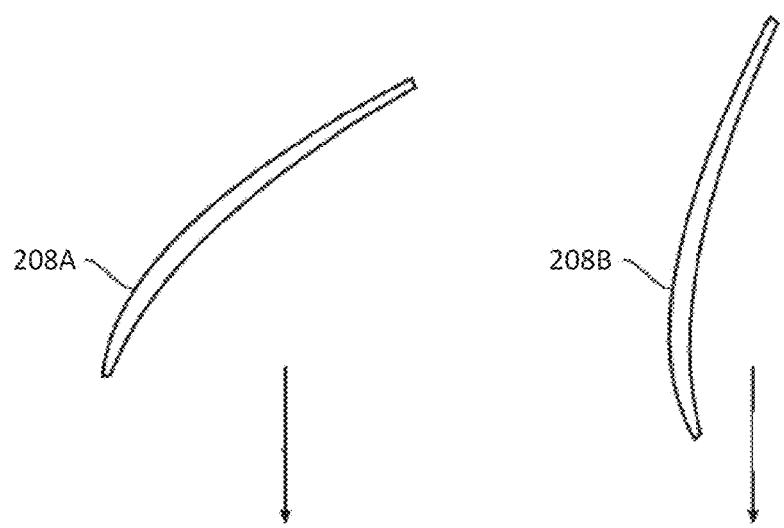
FIG. 5B is an illustration of a high angle of attack propeller blade angle and a low angle of attack propeller blade angle in accordance with one or more embodiments of the disclosure.

FIG. 5B is an illustration of a high angle of attack propeller blade angle and a low angle of attack propeller blade angle in accordance with one or more embodiments of the disclosure. FIG. 5B includes a high angle of attack propeller blade 208A and a low angle of attack propeller blade 208B. Changing an angle of attack of each of the augmentor fan blades may allow the air-driven augmentor fan equipped propulsor to vary a percentage of thrust coming from the augmentor fan. The high angle of attack propeller blade 208A may produce more power, but may also produce more noise. The high angle of attack propeller blade 208A corresponds to a high augmentor fan ratio as a percentage of total engine power. The low angle of attack propeller blade 208B may produce less noise, but may also produce less power. The low angle of attack propeller blade 208B corresponds to a low augmentor fan ratio as a percentage of total engine power.

FIG. 6 is an illustration of three mass flow streams of an exemplary aircraft propulsor with an air-driven augmentor fan in accordance with an embodiment of the disclosure. FIG. 6 illustrates three mass flow streams of an air-driven augmentor fan equipped aircraft propulsor according to an embodiment of the disclosure. The three mass flow streams comprise a core mass flow stream 660, a ducted fan mass flow stream 662, and an augmentor fan mass flow stream 664.

The core engine 202 produces the core mass flow stream 660 with a relative high velocity (Vc). For example, but without limitation, about 10% to about 20% of the thrust from the ultra-aircraft propulsor 200, may come from the core mass flow stream 660. Control of the core mass flow stream 660 may be provided by throttling the core engine 202. The core mass flow stream 660 may be substantially circumscribed by the ducted fan mass flow stream 662.

The ducted fan 204 produces the ducted fan mass flow stream 662 with a relative medium velocity (Vd). For example, but without limitation, about 10% to about 50% of the thrust from the aircraft propulsor 200 may come from the ducted fan mass flow stream 662. A difference between Vd and the Vc may reduce at least one of turbulence and noise generation between the ducted fan mass flow stream 662 and the core mass flow stream 600. Control of the ducted fan mass flow stream 662 may be provided by throttling the core engine 202. The ducted fan mass flow stream 662 may be substantially circumscribed by the augmentor fan mass flow stream 664.

The augmentor fan 208 produces the augmentor fan mass flow stream 664 with a relative medium velocity (Vaf), which may be lower than the velocity (Vd) of the ducted fan mass flow stream 662. For example, but without limitation, about 30% to about 80% of the thrust from the aircraft propulsor 200 may come from the augmentor fan mass flow stream 664. A difference between the Vaf and the Vd can reduce at least one of turbulence and noise generation between the augmentor fan mass flow stream 664 and the ducted fan mass flow stream 662. Control of the augmentor fan mass flow stream 664 is provided by, for example, changing the resistance of the hub ring to rotation, changing the geometry of the flow path (e.g., changing the size of the flow path, the size of the inlet, and/or the size of the outlet), or changing a pitch angle of the augmentor fan blades of the augmentor fan 208.

The three mass flow streams of the aircraft propulsor 200 may be suitably controlled to vary power and noise output based on, for example but without limitation, various fight conditions, operation requirements and parameters, and the like, which can be programmed into the controller 216 so that operation is transparent to a human pilot.

Figure 7A:
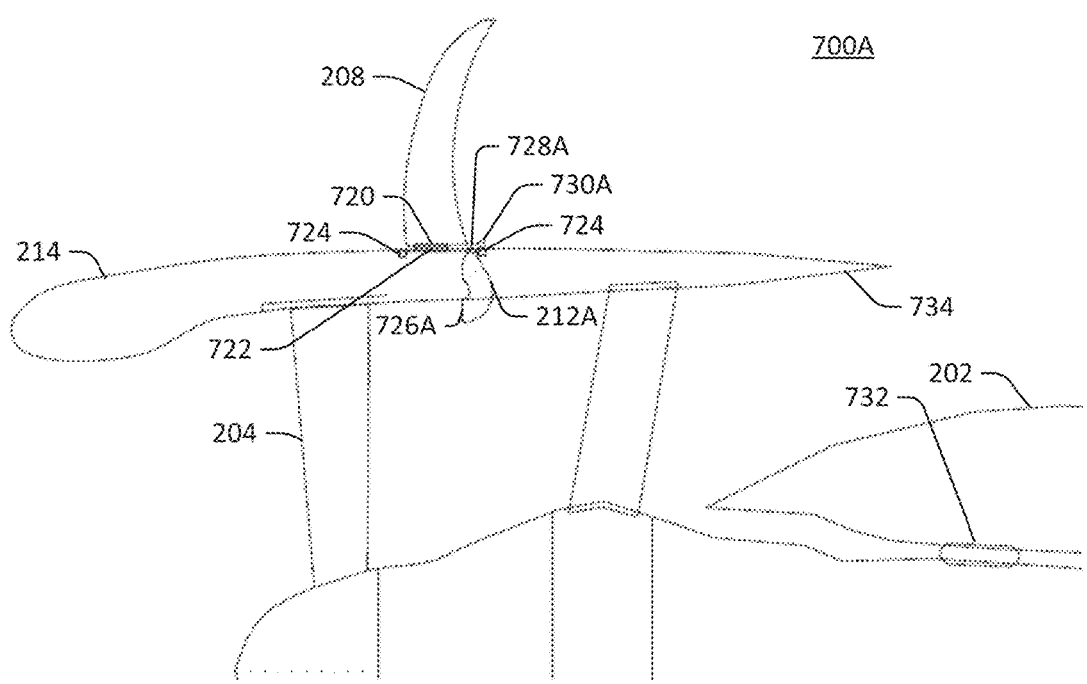
FIGS. 7A-D illustrates various flow path configurations of aircraft propulsors with air-driven augmentor fans in accordance with various embodiments of the disclosure.

FIGS. 7A-D illustrates various flow path configurations of aircraft propulsors with air-driven augmentor fans in accordance with various embodiments of the disclosure. FIG. 7A shows an embodiment of an aircraft propulsor with an air-driven augmentor fan where the outlet for the energized air is coupled to a nacelle of the aircraft propulsor. The aircraft propulsor 700A of FIG. 7A includes a nacelle 214, an augmentor fan 208, an augmentor hub ring 722, an fan blade pitch varying mechanism 720, an inlet 726A, a flow path 212A, an outlet 730A, an optional annular geometry revolving ring 728A, a ring bearing 724, a ducted fan 204, a core engine 202 with a combustion chamber 732, and a bypass exhaust 734.

The nacelle 214 may include the bypass exhaust 734. The bypass exhaust 734 may be a back portion of the nacelle 214 where energized air (that is not received or intaked by the inlet 726A) may exit. The combustion chamber 732 may be a part of the core engine 202 and may power the ducted fan 204.

The hub ring 722 may allow the augmentor fan 208 to rotate relative to the ducted fan 204, the nacelle 214, and/or other portions of the aircraft propulsor 700A. The hub ring 722 may rotate via the ring bearing 724. In certain embodiments, the hub ring 722 may rotate along with the augmentor fan 208 via the ring bearing 724, but other embodiments may rotate the augmentor fan 208 independently of the hub ring 722 via, for example, a bearing disposed between the hub ring 722 and the augmentor fan 208.

The inlet 726A may intake air energized by the ducted fan 204. The inlet 726A may be variable in size by, for example, the opening and closing of doors on the front of the intake, varying the size of the intake via mechanisms that open and contract, changing at least one side of the intake opening to change the surface area of the intake, or other techniques. Varying the size of the inlet 726A may allow higher or lower torque to be provided to the augmentor fan and thus cause the augmentor fan to rotate at higher or lower speeds (e.g., higher or lower rpms) and/or higher or lower thrust/power settings (e.g., by varying blade pitch angles). The size of the inlet 726A may be determined by a controller, such as the controller 216. In certain embodiments, the controller may automatically determine the size of the inlet due to certain pilot controls and/or environmental factors (e.g., thrust lever position, blade pitch control position, thrust reverse control position, air speed, elevation/altitude, radio altitude, bank angle, wing and flap positions, and other factors).

In certain embodiments, the inlet 726A may be a scoop located behind the ducted fan 204. In other embodiments, the inlet 726A may be, for example, a duct that may be flush with the inner wall of the nacelle 214. The duct may be, for example, a circular duct, a NACA duct, or a duct of any other geometry.

The flow path 212A may connect the inlet 726A and the outlet 730A. The flow path 212A may be of a smooth geometry to allow airflow within the flow path 212A to continue flowing in at least one of (i) a substantially laminar manner and (ii) a substantially low-loss manner (e.g., a power loss of approximately 5% or approximately 1% or less, or, in other words, preserve approximately 95% or more or approximately 99% or more of the energized air's power), and (iii) a favorable pressure gradient flow path. The cross sectional area (or the area of the flow path 212A that has the smallest cross sectional area) of the flow path 212A may be variable to increase or decrease the flow rate through the flow path 212A. The flow path 212A may vary in cross sectional area by, for example, the opening and closing of blocking doors within the flow path 212A that may increase obstruction of the flow path 212A when closed, by the opening and closing of orifices within the flow path 212A, by relaxing or constricting the flow path 212A (e.g., changing the cross-sectional area of the flow path 212A), by flowing the air through one of a plurality of possible flow paths with each flow path having a different restriction, or through other techniques. The size of the flow path 212A may be determined by a controller, such as the controller 216, as described for the inlet 726A.

The outlet 730A may exhaust air that has flowed through the flow path 212A. The outlet 730A may be variable in size by, for example, the opening and closing of doors on the outlet, varying the size of the outlet 730A via mechanisms that open and contract (such as variable nozzles), changing at least one side of the outlet to change the surface area of the outlet, or other techniques. Varying the size of the outlet 730A may also allow higher or lower torque to be imparted to the augmentor fan and thus cause the augmentor fan to rotate at higher or lower speeds (e.g., higher or lower rpms). The size of the inlet 726A may be determined by a controller, such as the controller 216, as described for the inlet 726A.

In certain embodiments, the outlet 730A may be coupled to the nacelle 214. Accordingly, the outlet 730A in such embodiments may be "fixed" relative to the nacelle. In other embodiments, the outlet 730A may rotate along with the augmentor fan 208. As such, the outlet 730A in such embodiments may be "fixed" relative to the augmentor fan 208. In embodiments where the outlet 730A may rotate along with the augmentor fan 208, the optional annular geometry revolving ring 728A may allow the inlet 726A and/or the flow path 212A to be "fixed" relative to the nacelle, but the outlet 730A to rotate with the augmentor fan 208. The annular geometry revolving ring 728A may, in certain embodiments, rotate along with the outlet 730A and include bearings, sliding surfaces, and/or other mechanisms to allow rotation of the revolving ring 728A. The revolving ring 728A may also include air flow paths to allow air to flow from the flow path 212A to the air flow paths on the revolving ring 728A and then through the outlet 730A. Additionally, in certain embodiments, the inlet 726A and/or the flow path 212A may also rotate with the augmentor fan 208. In such embodiments, the inlet 726A and/or the flow path 212A may rotate along with the outlet 730A.

In certain embodiments, the outlet 730A may drive the augmentor fan 208 by directing the energized air to create a torque on the augmentor fan 208. The outlet 730A may create the torque by being offset relative to the augmentor fan 208 (e.g., by positioning the outlet 730A azimuthally offset from the augmentor fan 208) or by positioning the outlet 730A to exhaust the energized air at an angle to the augmentor fan 208 (e.g., at an angle relative to the flow of air through the bypass or the core engine 202). The fan blade pitch varying mechanism 720 may change the pitch of the fan blade. The fan blade pitch varying mechanism 720 may be further described in FIG. 8B.

Figure 7B:
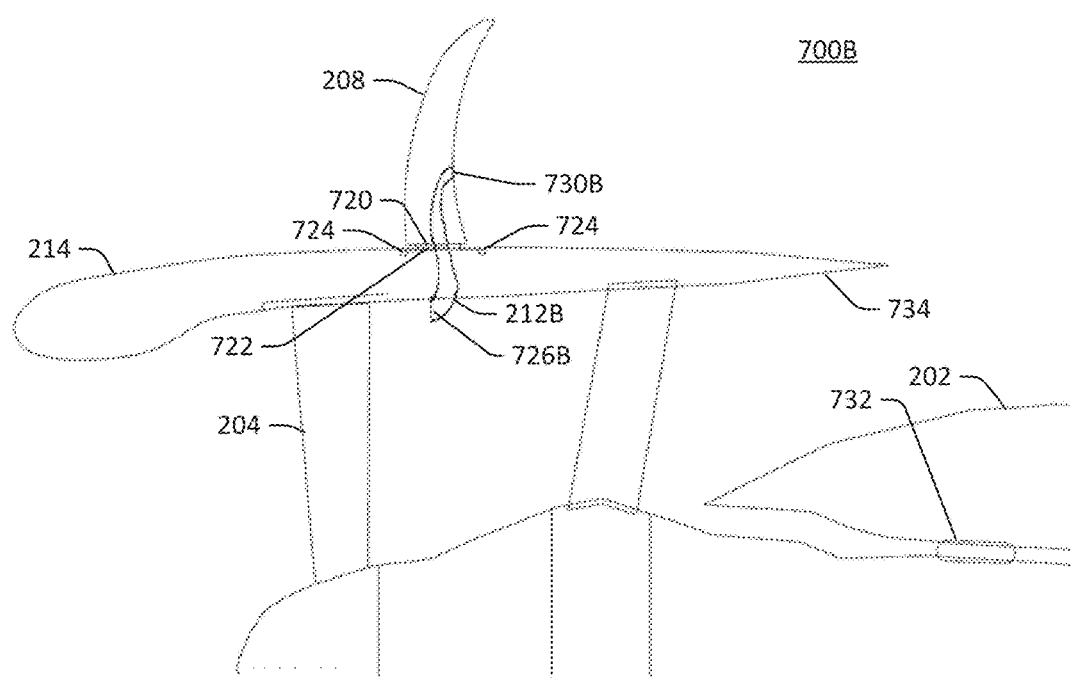

FIG. 7B shows an embodiment of an aircraft propulsor with an air-driven augmentor fan where the outlet for the energized air is coupled to the augmentor fan. The aircraft propulsor 700B of FIG. 7B includes a nacelle 214, an augmentor fan 208, an augmentor hub ring 722, a fan blade pitch varying mechanism 720, an inlet 726B, a flow path 212B, an outlet 730B, a ring bearing 724, a ducted fan 204, a core engine 202 with a combustion chamber 732, and a bypass exhaust 734.

The flow path 212B of the aircraft propulsor 700B may include an outlet 730B located on the augmentor fan 208. Accordingly, the outlet 730B and at least a portion of the flow path 212B may rotate along with the augmentor fan 208 via systems and techniques described herein. The outlet 730B may be located on any portion of the augmentor fan 208 and may generally be positioned to exhaust energized air towards the rear of the aircraft propulsor 700B. In certain embodiments, the inlet 726B may be fixed relative to the nacelle. In such an embodiment, the flow path 212B and/or the outlet 730B may include a revolving ring, similar to the revolving ring 728A of FIG. 7A, to allow the inlet 726B to be fixed to the nacelle while the outlet 730B rotates with the augmentor fan 208.

Figure 7C:
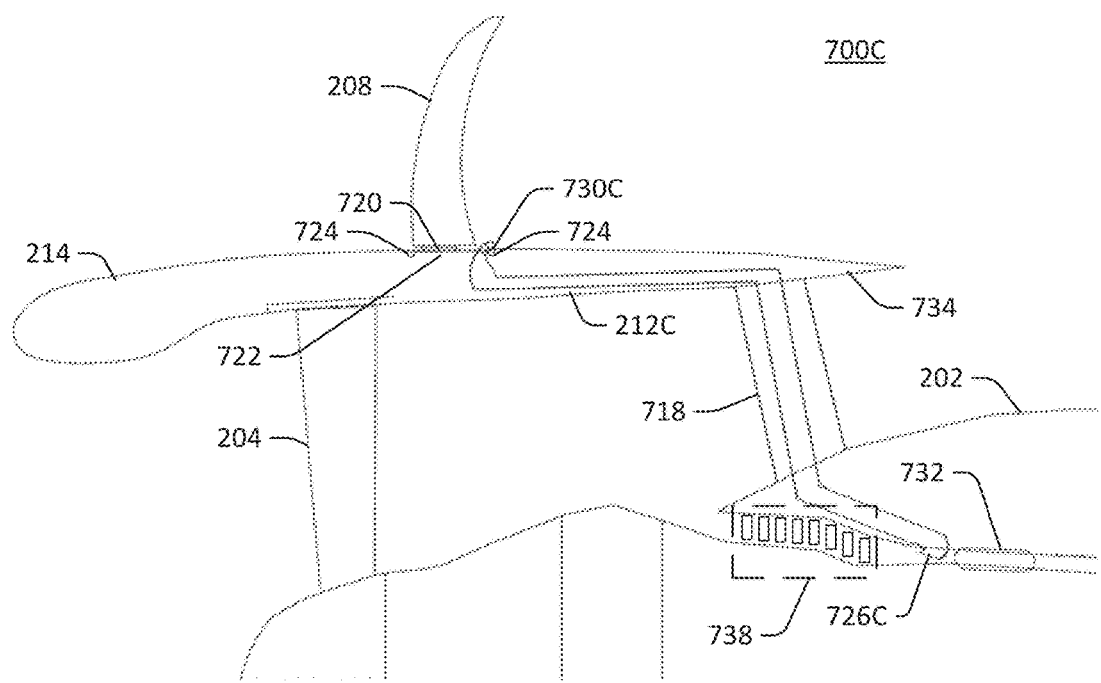

FIG. 7C shows an embodiment of an aircraft propulsor with an air-driven augmentor fan where the inlet receives air energized by the core engine 202. The aircraft propulsor 700C may be similar to the aircraft propulsor 700A of FIG. 7A. However, the inlet 726C of the aircraft propulsor 700C may be located after one or more compression stages of the core engine 202. The air received through the core engine 202 may first go through one or more compression stages, as shown by compressors 738. The compressors 738 may be a multi-stage compressor. In certain embodiments, the inlet 726C may receive energized air after a combustion stage, shown by the combustion chamber 732 of the core engine 202, but other embodiments may receive the energized air before the combustion chamber 732, but after one or more compression stages of the compressors 738.

After the inlet 726C has received the energized air, the energized air may travel through the flow path 212C. The flow path 212C may flow through a support strut 718 linking the core engine 202 and the bypass exhaust 734 or another portion of the nacelle. Though FIG. 7C depicts the flow path 212C as including sharp bends, certain embodiments may have a smooth internal flow path to minimize turbulence of the energized air flow. The energized air may then exit the flow path 212C via the outlet 730C to drive the augmentor fan 208.

Figure 7D:
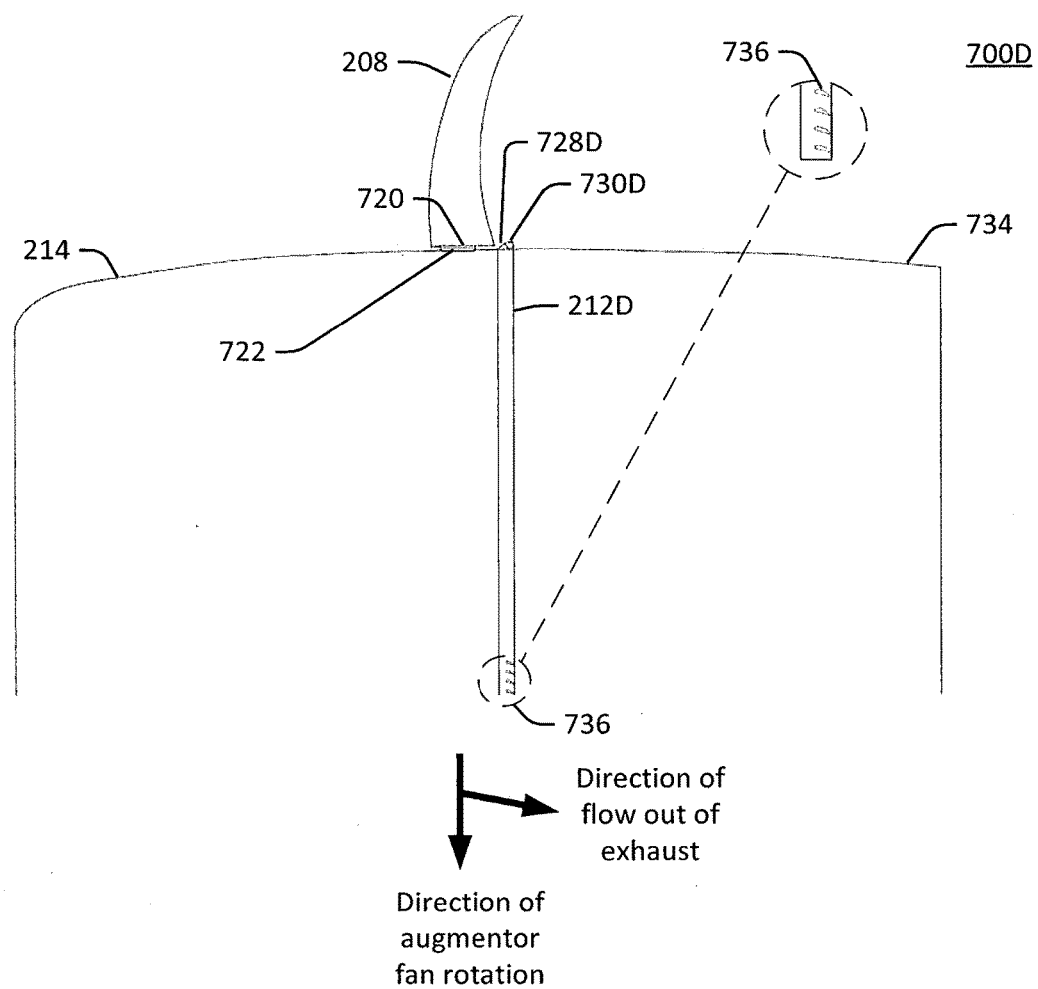

FIG. 7D shows another embodiment of an aircraft propulsor with an air-driven augmentor fan. FIG. 7D highlights the outlet 730D as, in FIG. 7D the outlet 730D may span the circumference of the nacelle 214. That is, the outlet 730D may be similar to the outlet 230 shown in FIG. 4C. Additionally, the flow path 212D and/or the outlet 730D may include flow conditioners 736. The flow conditioners 736 may orient the direction of flow of the energized air exiting the outlet 730D to be at an angle to the direction of rotation of the augmentor fan 208 (e.g., not perpendicular) as shown by the arrows and annotations in FIG. 7D. In certain embodiments, the flow conditions 736 may orient the direction of flow of energized air to be between 30 and 89 degrees relative to the direction of rotation of the augmentor fan 208. In certain embodiments, the angle of the flow conditioners 736 may be variable. That is, the flow conditioners 736 may change so that the direction of flow of the energized air exiting the outlet 730D can be varied. The angle of the flow conditioners 736 may be changed by, for example, hydraulic pressure, electric motors, mechanical connections, hydraulic connections, or other techniques and systems of moving the angle of the flow conditioners 736.

Figure 8A:
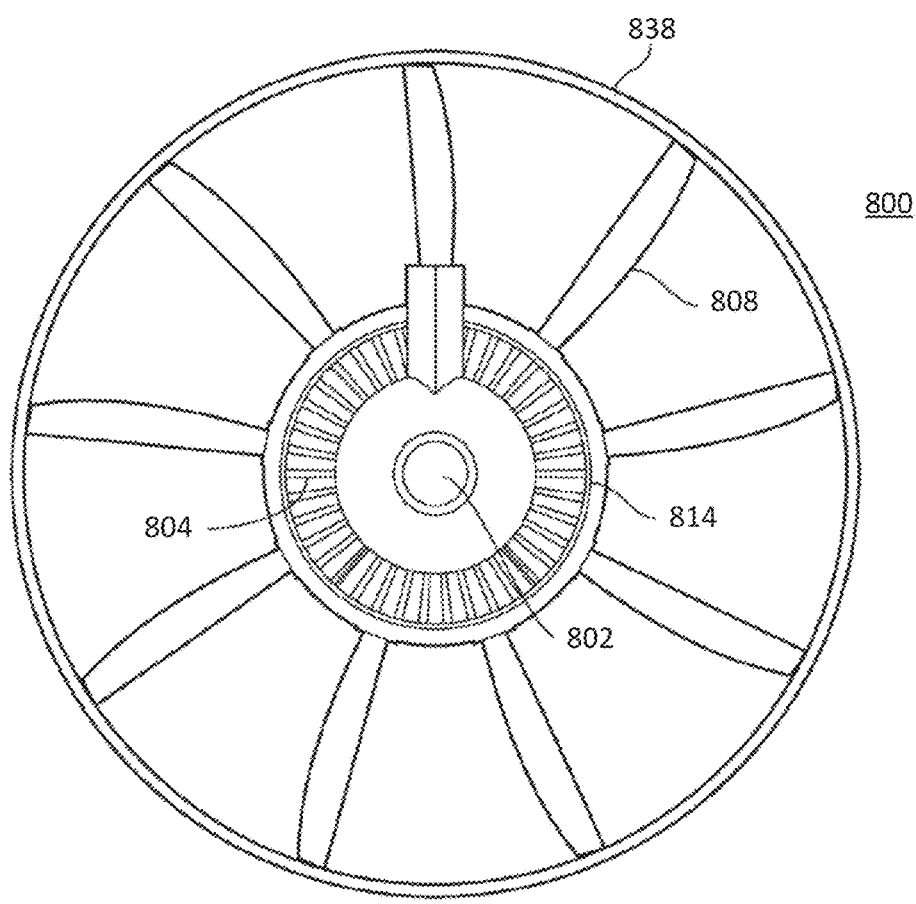
FIG. 8A illustrates a rear view of an augmentor fan showing an augmentor fan tip ring in accordance with an embodiment of the disclosure.

FIG. 8A illustrates a rear view of an augmentor fan showing an augmentor fan tip ring in accordance with an embodiment of the disclosure. FIG. 8A shows an augmentor fan equipped aircraft propulsor 800 showing an augmentor fan tip ring 838. The augmentor fan tip ring 838 circumscribes the augmentor fan 808. The augmentor fan tip ring 838 may also circumscribe a ducted fan 804 and/or a core engine 802. The augmentor fan tip ring 838 reduces or eliminates blade tip vortices. Reducing or eliminating blade tip vortexes may reduce drag and noise. The augmentor fan tip ring 838 may also provide a containment to ensure that damaged blades do not fly loose, which may also offer an improvement in passenger perception and preference. In practice, the augmentor fan tip ring 838 may have a slightly noncircular shape when the augmentor fan 808 is not rotating. When the augmentor fan 838 is rotating, the rotational loads may cause the augmentor fan tip ring 838 to take a circular or near-circular shape at typical operational rotation speeds. An average chord of the augmentor fan tip ring 838 may be, for example and without limitation, between about 0.025 to about 0.5 of an average chord of the nacelle 814. The augmentor fan tip ring 838 may include, for example but without limitation, a ring airfoil configuration, where an average chord of the ring airfoil may be, for example and without limitation, between 1 and 5 times the average chord of blades of the augmentor fan 838. The average thickness to average chord ratio of the ring airfoil may be, for example but limitation, between about 0.03 and about 0.30. The augmentor fan 808 may have blade pitch variability mechanisms (e.g., bearings, pivots, swivels, or other components) to allow coupling of augmentor fan blades to the augmentor fan tip ring 838 while still allowing the augmentor fan blades to rotate or change in pitch.

Figure 8B:
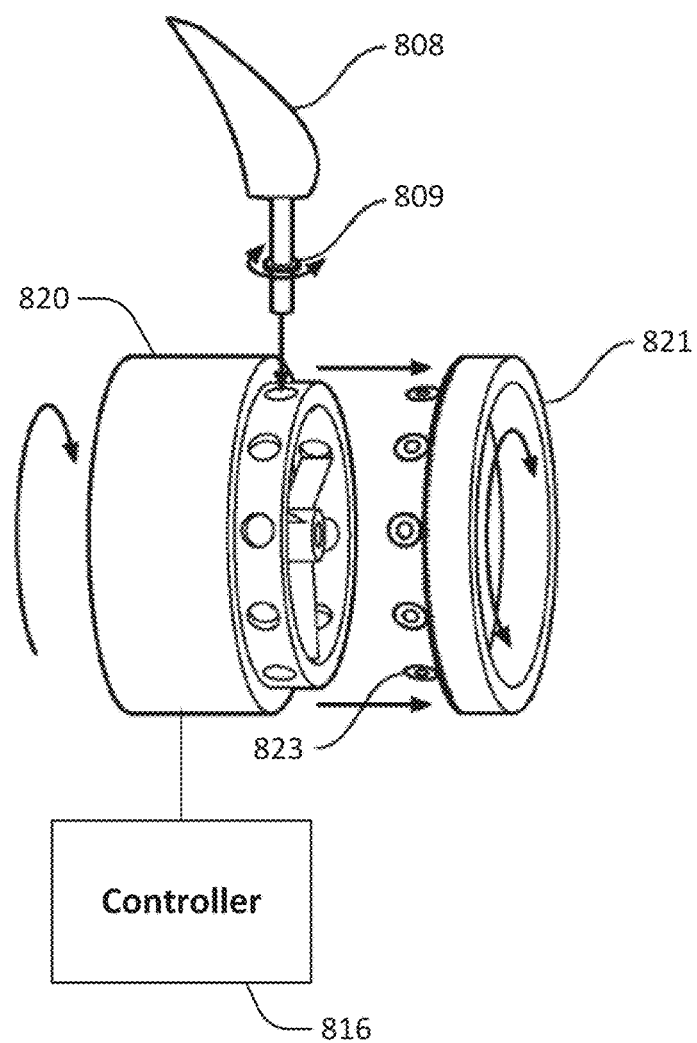
FIG. 8B illustrates an augmentor fan blade pitch control unit (PCU) mechanism in accordance with an embodiment of the disclosure.

FIG. 8B illustrates an augmentor fan blade pitch control unit (PCU) mechanism in accordance with an embodiment of the disclosure. FIG. 8B may further illustrate a fan blade pitch varying mechanism 820, which may be similar to the fan blade pitch varying mechanism 720 of FIG. 7A. The fan blade pitch varying mechanism 820 may include a rotating gear ring 821 that may provide torque to one or more augmentor fan blade root 809 of an augmentor fan blade 808 from a PCU drive 823 to control or vary the pitch of the augmentor fan blade 808. Each of the augmentor fan blade roots 809 may be paired with PCU drives 823 coupled to the rotating gear ring 821. Thus, if one or more of the PCU drives fail, the remaining PCU drives may still provide enough power or drive to the rotating gear ring 821 to control the vary of all the augmentor fan blades. Accordingly, it is appreciated that, in addition to providing redundancy, the number of PCU drives may also be significantly reduced due to the rotating gear ring 821 controlling the pitch of the augmentor fan blades 808. The rotating gear ring 821 may be operable to ensure the same pitch angle for all the augmentor fan blades. The rotating gear ring 821 may be, for example but without limitation, automatically driven electrically, hydraulically, pneumatically, a combination thereof, and the like. The PCU drives 823 may be controlled automatically via a controller 816 (e.g., implemented in the manner of the controller 216 of FIG. 3 in some embodiments) in response to data from an engine control unit ECU and the like.

Figure 9:
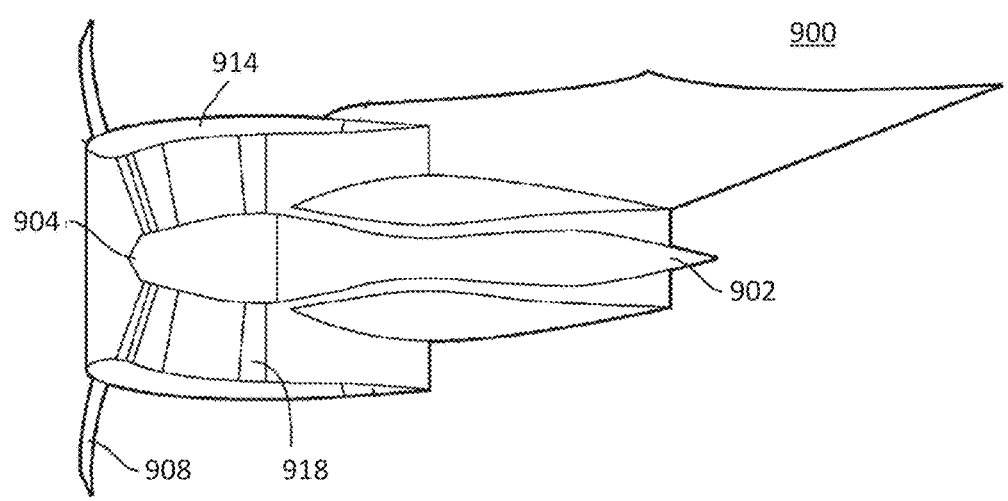
FIGS. 9-11 illustrate cross-sectional views of various embodiments of aircraft propulsors with air-driven augmentor fans in accordance with various embodiments of the disclosure.
Figure 10:
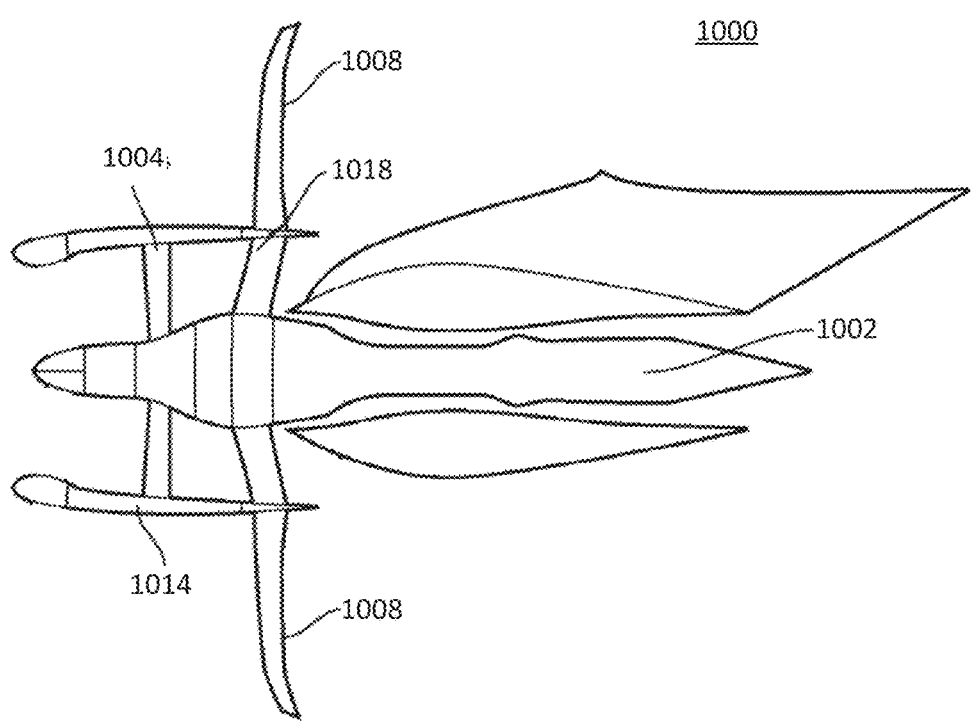
Figure 11:
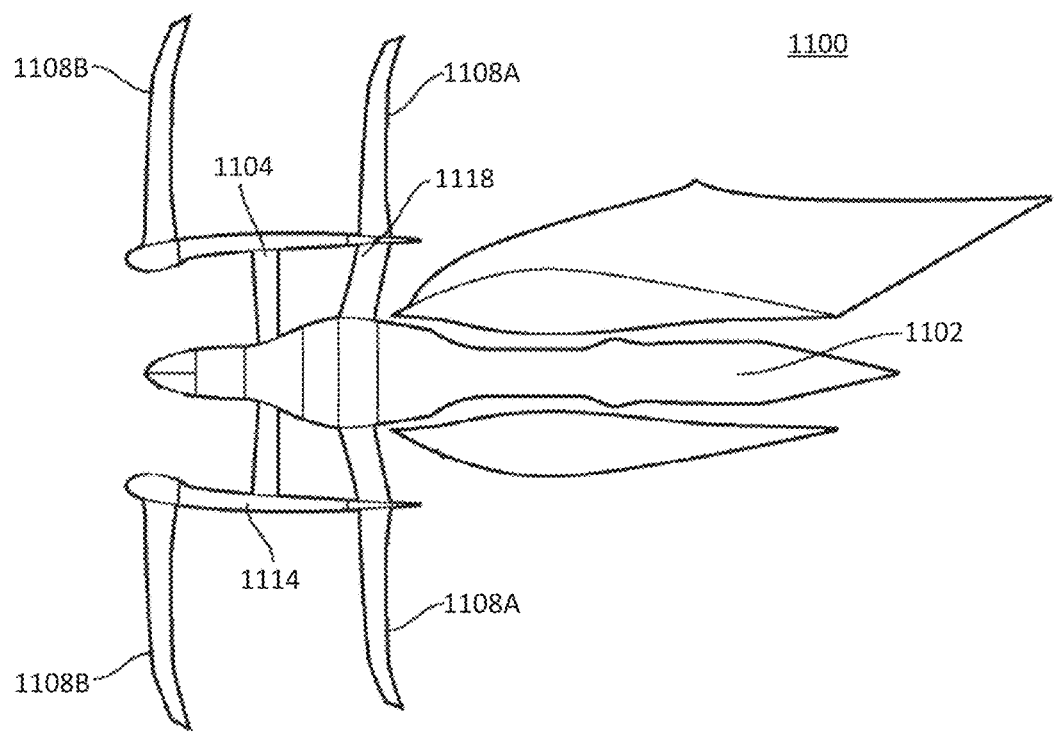

FIGS. 9-11 illustrate cross-sectional views of various embodiments of aircraft propulsors with air-driven augmentor fans in accordance with various embodiments of the disclosure. FIG. 9 illustrates a schematic cross sectional view of an example aircraft propulsor 900 with a front mounted augmentor fan 908 according to an embodiment of the disclosure. The propulsor 900 includes a core engine 902, a nacelle 914, a ducted fan 904, and an augmentor fan 908. An augmentor hub ring may rotate the augmentor fan 908 located on the forward end of the nacelle 914. The augmentor fan 908 may be driven by air energized by the ducted fan 904. In certain embodiments, the energized air used to drive the augmentor fan 908 may be received or drawn from an area behind the ducted fan 904. In other embodiments, the air may be accelerated after entering the front inlet of the nacelle 914, but before reaching the ducted fan 904. In such embodiments, the energized air used to drive the augmentor fan 908 may be received or drawn from an area in front of the ducted fan 904. Additionally, air-driven augmentor fan equipped aircraft propulsors described in FIG. 9 and elsewhere in this disclosure may include one or more thrust reversers.

FIG. 10 illustrates a schematic cross sectional view of an example aircraft propulsor 1000 with a rear mounted augmentor fan 1008 according to an embodiment of the disclosure. The propulsor 1000 includes a core engine 1002, a nacelle 1014, a ducted fan 1004, an augmentor fan 1008, and a support strut 1018. In the embodiment shown in FIG. 10, the augmentor fan 1008 is located on a rear section of the nacelle 1014. The augmentor fan 1008 may be driven by air energized by the ducted fan 904. The energized air may be received by an inlet or inlets positioned behind the augmentor fan 1008, though other embodiments may receive the energized air through an inlet or inlets positioned in front of the augmentor fan 1008. The flow path(s) attached to the inlet may then route the energized car to an outlet behind or on a back surface of the augmentor fan 1008.

FIG. 11 illustrates a schematic cross sectional view of an example aircraft propulsor 1100 with both front and rear mounted augmentor fans according to an embodiment of the disclosure. The propulsor 1100 includes a core engine 1102, a nacelle 1114, a ducted fan 1104, a rear-mounted augmentor fan 1108A, a front-mounted augmentor fan 1108B, and a support strut 1118. The aircraft propulsor 1100 may include, for example but without limitation, any of the techniques and systems for driving the augmentor fans as decided herein. Accordingly, as the augmentor fans of FIGS. 9 and 10 are combined on one nacelle for FIG. 11, the augmentor fans 1108A and 1108B of FIG. 11 may be driven through the same techniques as detailed in FIGS. 9 and 10.

Figure 12:
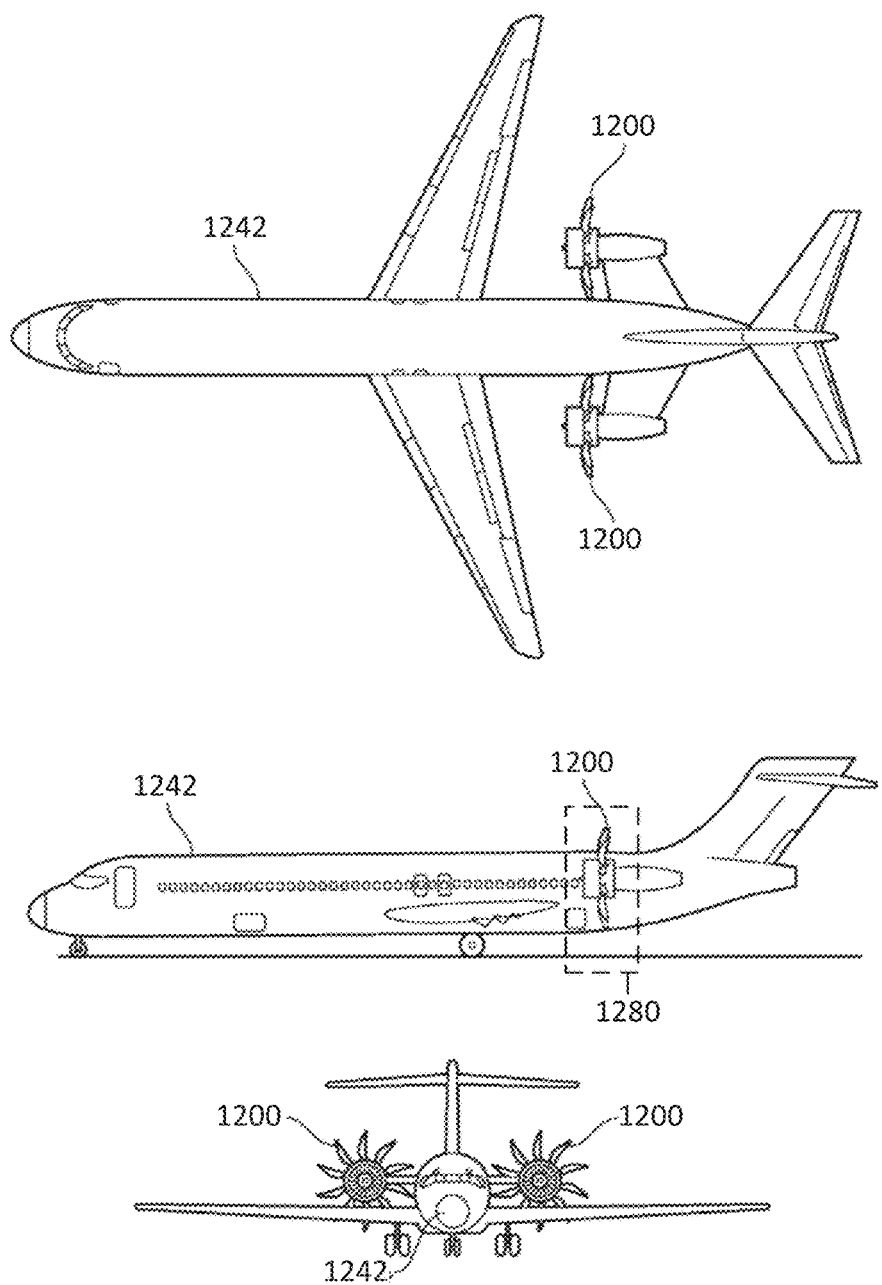
FIGS. 12-13 illustrate various configurations of aircraft propulsors with air-driven augmentor fans integrated on example aircrafts in accordance with various embodiments of the disclosure.
Figure 13:
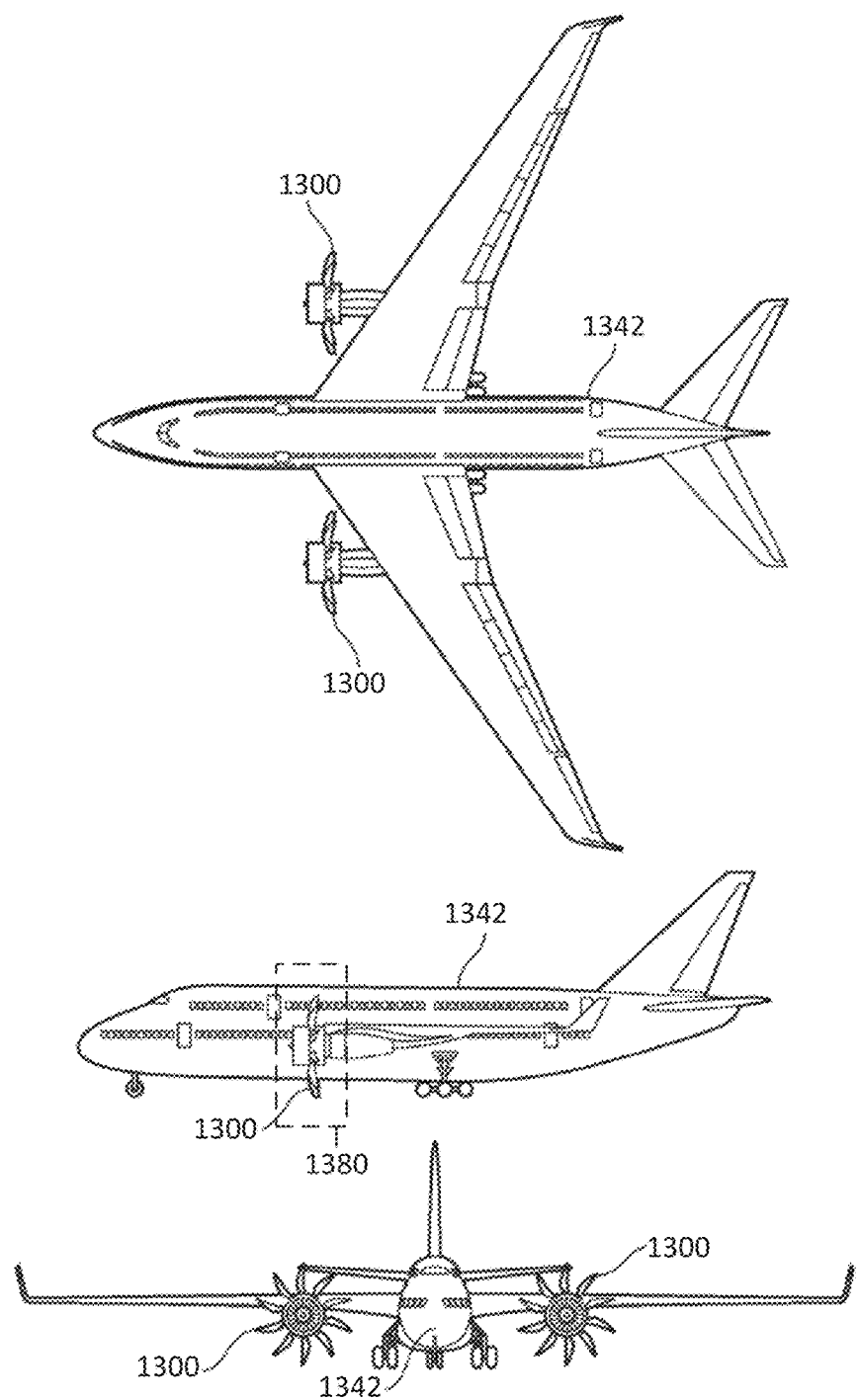

FIGS. 12-13 illustrate various configurations of aircraft propulsors with air-driven augmentor fans integrated on example aircrafts in accordance with various embodiments of the disclosure. FIG. 12 is an illustration of top, side, and front views of an example tail mounting of a single rotor pusher configuration of an air-driven augmentor fan equipped aircraft propulsor 1200 according to an embodiment of the disclosure. As shown in FIG. 12, two propulsors 1200 are mounted on a tail section of a low wing aircraft 1242. The fuselage of the area around the propulsor 1200, such as highlighted area 1280, may be strengthened.

FIG. 13 is an illustration of top, side, and front views an example under wing mounting on a large mid-wing aircraft 1342 of a single rotor tractor configuration of the air-driven augmentor fan equipped aircraft propulsor 1300 according to an embodiment of the disclosure. As shown in FIG. 13, two propulsors 1300 are mounted on respective wings of a mid-wing aircraft 1342. The fuselage of the area around the propulsor 1300, such as highlighted area 1380, may be strengthened to improve performance. Though FIGS. 12 and 13 show aircraft with two air-driven augmentor fan equipped aircraft propulsors, other embodiments may include, for example but without limitation, from one to eight or more air-driven augmentor fan equipped aircraft propulsors.

Embodiments of the air-driven augmentor fan equipped aircraft propulsor described herein may be used on aircraft to reduce fuel burn as compared to conventional turbofan propulsors. The greater effective bypass ratio of the augmentor fan, as well as the augmentor fan being air-driven, may contribute to the reduced fuel burn. Additionally, the fan blade count and configuration of the augmentor fan may be optimized over a wide range of air speeds and propulsor speeds and may also minimize or even reduce noise levels of the propulsor.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
a nacelle;
a turbofan engine comprising a core engine and a ducted fan driven by the core engine, the ducted fan circumscribed by the nacelle;
an augmentor fan comprising a plurality of augmentor fan blades, the augmentor fan circumscribing the nacelle and configured to rotate mechanically independently of any turbofan engines; and
at least one air flow path comprising:
a duct at least partially housed within a portion of the nacelle,
an inlet positioned to receive and pass air energized by the ducted fan to the duct, and
an outlet positioned to exhaust the energized air from the duct to drive the augmentor fan.

2. The aircraft propulsor of claim 1, wherein the augmentor fan blades comprise a front side and a back side and the outlet is located on the back side or rearward of the back side of the augmentor fan blades, and wherein the aircraft propulsor is configured to be mounted on an aircraft such that the front side is a side of the augmentor fan blade facing a nose of the aircraft, and the back side is a side of the augmentor fan blade facing a tail of the aircraft.

3. The aircraft propulsor of claim 1, wherein the outlet is configured to impart, by directing of the energized air, a torque on the augmentor fan.

4. The aircraft propulsor of claim 3, wherein the outlet is configured to impart the torque by directing the energized air with an azimuth component relative to the augmentor fan.

5. The aircraft propulsor of claim 1, wherein the outlet is coupled to the augmentor fan.

6. The aircraft propulsor of claim 1, wherein the core engine comprises one or more compressors and wherein the inlet receives energized air that bypasses the one or more compressors.

7. The aircraft propulsor of claim 1, further comprising a plurality of air flow paths, each of the plurality of air flow paths comprising a duct connecting at least one inlet and at least one outlet.

8. The aircraft propulsor of claim 1, wherein the duct comprises a plurality of inlets fluidically connected to an outlet, each inlet configured to receive air energized by the ducted fan.

9. The aircraft propulsor of claim 1, wherein the augmentor fan further comprises an augmentor hub ring circumscribing the nacelle and configured to allow rotation of the augmentor fan blades relative to the nacelle.

10. The aircraft propulsor of claim 1, wherein the inlet receives air before the core engine.

11. The aircraft propulsor of claim 1, wherein the core engine comprises one or more compression stages and the inlet receives air after at least a first stage of the core engine.

12. The aircraft propulsor of claim 1, wherein the flow path preserves 95 percent or more of the energized air's power.

13. The aircraft propulsor of claim 1, wherein at least one of the inlet, the outlet, and/or the flow path is configured to be adjustable in size.

14. The aircraft propulsor of claim 13, wherein the at least one of the inlet, the outlet, and/or the flow path is adjustable in size through one or more of: opening or closing of a door, relaxing or constricting of a pathway, and opening and closing of additional pathways.

15. The aircraft propulsor of claim 1, wherein the augmentor fan blades are configured to be geometry adjustable.

16. An aircraft comprising:
an aircraft propulsor comprising:
a nacelle,
a turbofan engine comprising a core engine and a ducted fan driven by the core engine, the ducted fan circumscribed by the nacelle,
an augmentor fan comprising a plurality of augmentor fan blades, the augmentor fan circumscribing the nacelle and configured to rotate mechanically independently of any turbofan engines, and
at least one air flow path comprising:
a duct at least partially housed within a portion of the nacelle;
an inlet positioned to receive and pass air energized by the ducted fan to the duct; and
an outlet positioned to exhaust the energized air from the duct to drive the augmentor fan;
a fuselage; and
a wing coupled to the fuselage, wherein the aircraft propulsor is coupled to at least one of the fuselage and the wing.

17. The aircraft of claim 16, further comprising a controller communicatively connected to at least one of the inlet, the flow path, the outlet, and/or the augmentor fan.

18. The aircraft of claim 17, wherein at least one of the inlet, the outlet, and/or the flow path is configured to be adjustable in size and the controller is communicatively connected to the adjustable inlet, outlet, and/or flow path and configured to adjust the size of the adjustable inlet, outlet, and/or flow path.

19. The aircraft of claim 18, wherein the controller is configured to detect an air speed of the aircraft, a core engine speed, and/or an augmentor fan speed and adjust the size of the adjustable inlet, outlet, and/or flow path responsive to the air speed, the core engine speed, and/or the augmentor fan speed.

20. The aircraft of claim 17, wherein the augmentor fan blades are configured to be geometry adjustable and the controller is communicatively connected to the augmentor fan and configured to adjust the geometry of the augmentor fan blades.

21. The aircraft of claim 20, wherein the controller is configured to detect an air speed of the aircraft, a core engine speed, and/or an augmentor fan speed and adjust the geometry of the augmentor fan blades responsive to the air speed, the core engine speed, and/or the augmentor fan speed.

22. The aircraft of claim 16, wherein the augmentor fan of the engine is configured to rotate away from the fuselage at a bottom of rotation.

23. The aircraft of claim 16, wherein a first portion of the fuselage proximate the aircraft propulsor is strengthened compared to a second portion of the fuselage away from the aircraft propulsor.

24. A method of operating the aircraft propulsor of claim 1, the method comprising:
receiving, with the inlet, the energized air;
flowing the energized air to the outlet;
exhausting the energized air; and
driving, with energy from the exhausted air, the augmentor fan.

25. The method of claim 24, wherein driving the augmentor fan includes imparting a torque on the augmentor fan with the energized air.

26. The method of claim 25, wherein the torque is at least partially created by exhausting the energized air with an offset component relative to the augmentor fan.

27. An aircraft propulsor comprising:
a nacelle;
a turbofan engine comprising a core engine and a ducted fan driven by the core engine, the ducted fan circumscribed by the nacelle;
an augmentor fan comprising a plurality of augmentor fan blades, the augmentor fan circumscribing the nacelle and configured to rotate mechanically independently of any turbofan engines; and
at least one air flow path with means for:
receiving and passing air energized by the ducted fan,
flowing the energized air to an outlet positioned to drive the augmentor fan,
exhausting the energized air from the outlet, and
driving, with energy from the energized air exhausted by the outlet, the augmentor fan.

28. The aircraft propulsor of claim 27, wherein the air flow path further includes means for imparting a torque on the augmentor fan with the energized air exhausted by the outlet.

29. The aircraft propulsor of claim 27, further comprising means for adjusting a volume of the energized air flowing through the air flow path.

* * * * *

UNITED STATES PATENT AND TRADEMARK OFFICE
CERTIFICATE OF CORRECTION

| | |
|---|---|
| PATENT NO. | : 10,371,095 B2 |
| APPLICATION NO. | : 14/929000 |
| DATED | : August 6, 2019 |
| INVENTOR(S) | : Mithra M. K. V. Sankrithi |

It is certified that error appears in the above-identified patent and that said Letters Patent is hereby corrected as shown below:

In the Claims

At Column 16, Lines 34 and 35, Claim 12 change "wherein the flow path preserves" to --wherein the air flow path preserves--

Signed and Sealed this
Twenty-second Day of October, 2019

Andrei Iancu
*Director of the United States Patent and Trademark Office*